(12) United States Patent
Renz et al.

(10) Patent No.: US 9,143,020 B2
(45) Date of Patent: Sep. 22, 2015

(54) ELECTRIC DRIVE MOTOR FOR A WORK APPARATUS

(71) Applicant: Andreas Stihl AG & Co. KG, Waiblingen (DE)

(72) Inventors: Michael Renz, Stuttgart (DE); Alexander Haas, Spraitbach (DE); Adolf Juergen Neumann, Sulzbach an der Murr (DE); Markus Maier, Leutenbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 252 days.

(21) Appl. No.: 13/952,833

(22) Filed: Jul. 29, 2013

(65) Prior Publication Data
US 2014/0028126 A1    Jan. 30, 2014

(30) Foreign Application Priority Data
Jul. 27, 2012   (DE) .......................... 10 2012 014 926

(51) Int. Cl.
| *H02K 9/00* | (2006.01) |
| *H02K 9/06* | (2006.01) |
| *H02K 5/20* | (2006.01) |
| *H02K 3/24* | (2006.01) |
| *H02K 3/18* | (2006.01) |

(52) U.S. Cl.
CPC .. *H02K 9/06* (2013.01); *H02K 3/24* (2013.01); *H02K 5/20* (2013.01); *H02K 3/18* (2013.01)

(58) Field of Classification Search
CPC .............. H02K 9/06; H02K 5/20; H02K 9/04
USPC ...................... 310/52–59, 60 A, 63, 214, 215
See application file for complete search history.

(56) References Cited

U.S. PATENT DOCUMENTS

| 5,910,694 | A | * | 6/1999 | Yokozawa et al. ............... 310/89 |
| 6,861,774 | B2 | * | 3/2005 | Shimasaki et al. .............. 310/58 |
| 8,076,819 | B2 | * | 12/2011 | Taema .......................... 310/215 |
| 8,760,016 | B2 | * | 6/2014 | Klafter et al. ................... 310/61 |
| 2008/0193275 | A1 | * | 8/2008 | De Filippis et al. ............ 415/10 |
| 2010/0176603 | A1 | * | 7/2010 | Bushnell et al. ............... 290/1 B |
| 2011/0175468 | A1 | * | 7/2011 | Dutau ............................. 310/58 |

* cited by examiner

*Primary Examiner* — Thanh Lam
(74) *Attorney, Agent, or Firm* — Walter Ottesen P.A.

(57) ABSTRACT

An electric drive motor for a work apparatus includes a stator having two stator poles which are at a distance from one another in the circumferential direction and have respective field windings. The motor has a rotor which rotates between the stator poles and the rotor shaft of the rotor drives a fan wheel. The cooling-air flow generated by the fan wheel enters the stator, flows therethrough and is discharged therefrom. For effective cooling, a pole intermediate space is provided between the stator poles; and, for the cooling-air flow, this space is filled by a non-magnetic guide body to provide a cooling duct delimited by the guide body and the field windings. The guide body is fastened to a support at one stator end and is inserted axially into the stator at the other end thereof.

19 Claims, 6 Drawing Sheets

ELECTRIC DRIVE MOTOR FOR A WORK APPARATUS

CROSS REFERENCE TO RELATED APPLICATION

This application claims priority of German patent application no. 10 2012 014 926.3, filed Jul. 27, 2012, the entire content of which is incorporated herein by reference.

BACKGROUND OF THE INVENTION

Electric drive motors for portable, handheld work apparatuses, for example chain saws, hedge trimmers, brushcutters, et cetera, are known per se. Work apparatuses of this kind are constructed such that they are small and easy to handle and therefore can be easily and safely controlled. Electric drive motors which are used in narrow appliance housings require efficient cooling so that reliable operation is ensured.

SUMMARY OF THE INVENTION

It is an object of the invention to provide an electric drive motor for a work apparatus configured such that efficient cooling of the electric motor, which is adequate in every operating state, is ensured.

The electric drive motor of the invention is for a work apparatus. The electric drive motor includes: a stator having at least first and second stator poles; first and second electric field windings carried on corresponding ones of the stator poles; the first and second stator poles being arranged in a spaced relationship to each other in a circumferential direction and conjointly defining an intermediate pole space therebetween; a rotor having a rotor shaft and being configured to rotate between the first and the second stator poles; a fan wheel configured to be driven by the rotor shaft; the fan wheel configured to generate a cooling air flow which enters the stator, flows through the stator and is blown out of the stator; a non-magnetic guide body filling the intermediate pole space so as to cause the first and second field windings and the guide body to conjointly delimit a cooling channel for the cooling air flow; a support; and, the guide body having a first end fixed on the support and a second end axially inserted into the stator.

The pole intermediate space which is situated between adjacent stator poles in the circumferential direction is filled by a non-magnetic guide body according to the invention. The design from non-magnetic material ensures that the inserted guide body does not influence the magnetic properties, for example does not change the magnetic flux. Owing to the inserted guide body and the winding, a cooling duct for the cooling-air flow is delimited, so that the cooling-air stream is routed directly past the winding and therefore a heat exchange between the cooling-air flow and the winding is ensured. In a simple manner, the guide body for forming the cooling ducts is fixed to a support at one end and inserted axially into the pole intermediate space by way of the other, free end, as a result of which the fillers are mounted in the pole intermediate space in a simple manner. The stator and the support are also mechanically connected to one another in a rotationally fixed manner as a result of the finger-like interengagement between the stator and the support.

In a simple manner, the support is fixed to the end face of the stator. The support is preferably formed by a fan housing which has to be fixed to the end face of the stator in any case.

The guide body extends in the circumferential direction of the stator from one winding to the adjacent winding, so that flow paths which are unsuitable for heat exchange are largely blocked by the guide body. The guide body is expediently rounded on the side thereof which faces the rotor, wherein the guide body and the pole face of the stator poles form a common inner, closed circumferential wall.

In this case, the guide bodies are arranged such that the guide body delimits a cooling duct with each of its wall sections which are situated in the peripheral direction, that is, a guide body has two associated cooling ducts.

A guide body preferably extends over more than half the height of the stator. It is practical for the guide body to extend over approximately the height of a stator pole.

The cooling duct is axially open at its end which faces away from the support; a cooling-air window is provided at that end of the cooling duct which faces the support, the cooling-air window being situated so as to radially face the rotor. The cooling-air window is situated approximately at the elevation of the edge of the intake opening to the fan wheel of the fan housing. In this case, the cooling-air window is delimited by the guide body itself and a non-magnetic pole extension.

The guide body itself is formed by an approximately U-shaped guide wall.

The electric motor is configured in such a way that the rotor shaft is fitted with the fan wheel at one end and with an electric commutator at the other end. The cooling-air flow which is generated by the fan wheel is drawn into the stator in the region of the commutator, routed through the cooling ducts, past the windings, to the intake opening in the fan housing and expelled by means of the fan wheel.

According to a feature of the invention, two stator poles are situated diametrically opposite one another, wherein the cooling duct can be delimited by the winding, the guide body, the stator pole and preferably by the stator itself.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
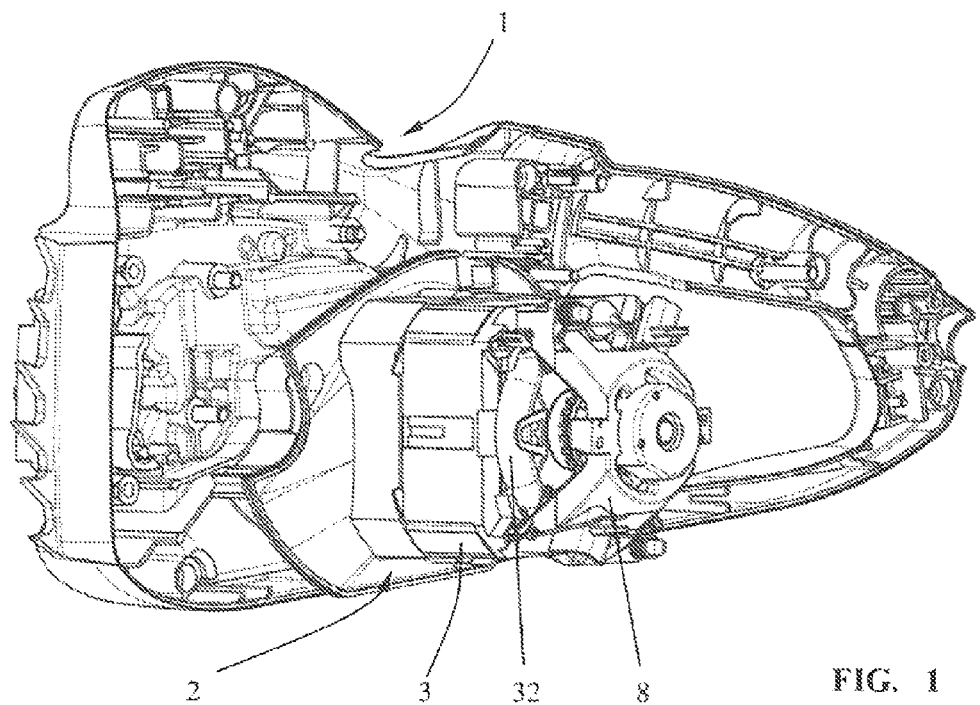
FIG. 1 shows a part view of a portable work apparatus having an electric drive motor.

The work apparatus 1 shown it FIG. 1 is shown with a partial housing; the housing is open, so that the view to the drive motor 2 is open.

The partial shell shown in FIG. 1 is the housing of a chain saw, the saw chain of the chain saw being driven by the drive motor 2. In the exemplary embodiment shown, the drive motor 2 is aft electric motor 3, for example a DC electric motor, an electrically commutated motor (EC motor) or some other universal motor.

Figure 3:
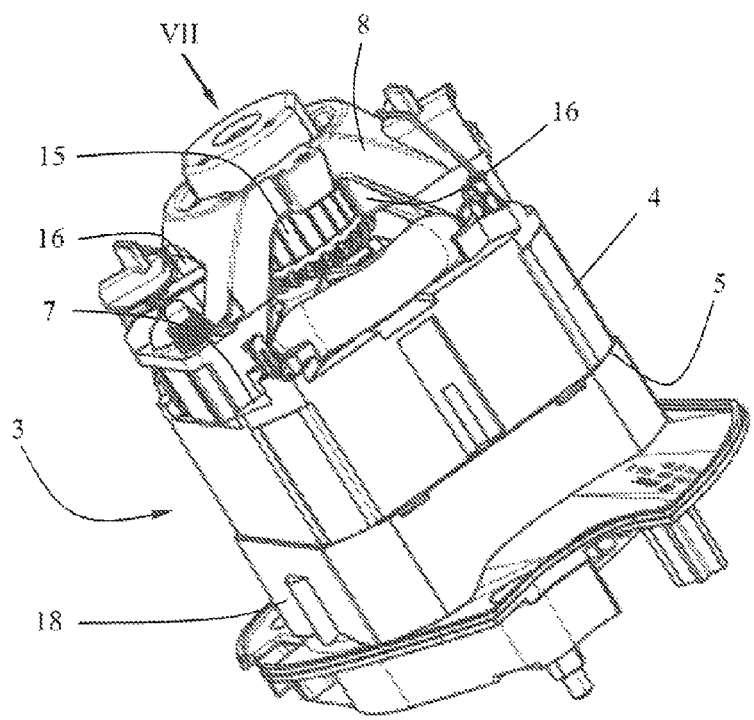
FIG. 3 is a perspective view of an electric motor as a drive motor in the work apparatus of FIG. 1.

The electric motor 3 perspectively illustrated in FIG. 3 substantially includes a stator 4, a fan housing 6 being provided at one end face 5 of the stator, and an end plate 8 for the rotor shaft 9 of a rotor 10 being provided at the other end face 7 of the stator.

At one end 11, the rotor shaft 9 is held in a bearing 12 (FIG. 4) which is held in a bearing receptacle in the end plate 8. The end plate 8 is fixed to the stator 4.

A commutator 15 is arranged between the windings 13 of the rotor 10 and the end 11 of the rotor shaft 9, the commutator being connected to the ends of the windings 13 on the rotor 10. Current is supplied to the windings 13 of the rotor 10 via the commutator and the sliding contacts, preferably carbon elements 24, of the commutator.

Figure 2:
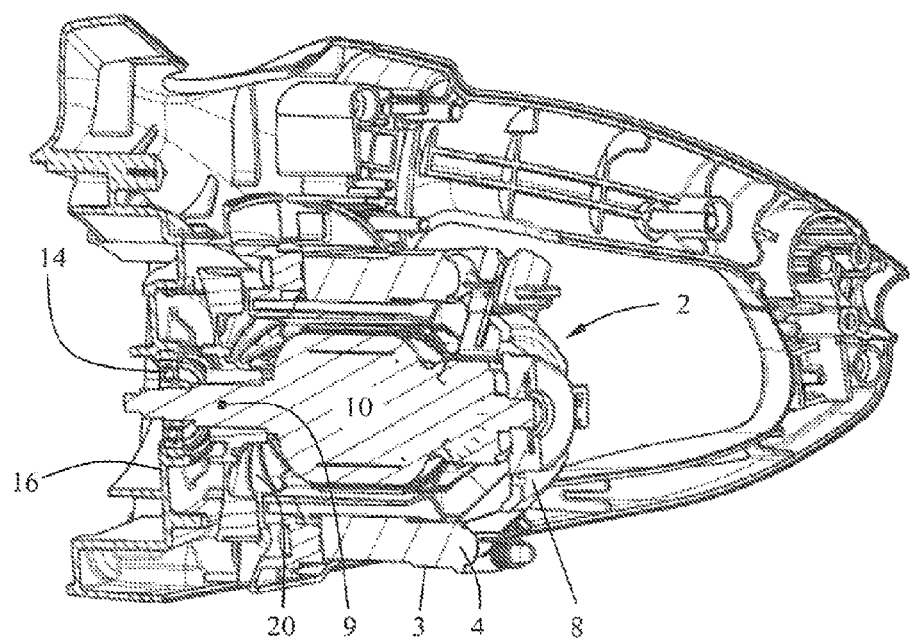
FIG. 2 shows a section through the drive motor of FIG. 1 in a work apparatus.

The other end 17 of the rotor shaft 9 is supported (FIG. 2) in a bearing 14 which is held in the housing shell 16 (FIG. 2) of the work apparatus 1.

The end 17 of the rotor shaft 9 projects through a support 18 which is formed by the fan housing 6 in the embodiment shown. A cooling-air spiral 19 is formed in the fan housing 6 and a fan wheel 20 rotates in the cooling-air spiral. The fan wheel 20 conveys cooling air to cool the electric motor 3, wherein a cooling-air stream 42 (FIG. 4) is blown or drawn through the stator 4 of the electric motor 3.

Figure 6:
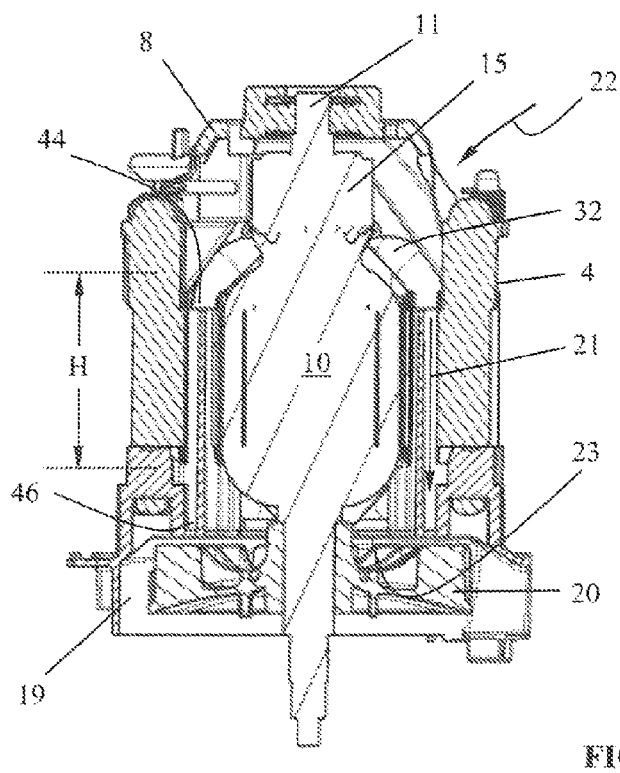
FIG. 6 shows a section along Line VI-VI OP FIG. 5.
Figure 7:
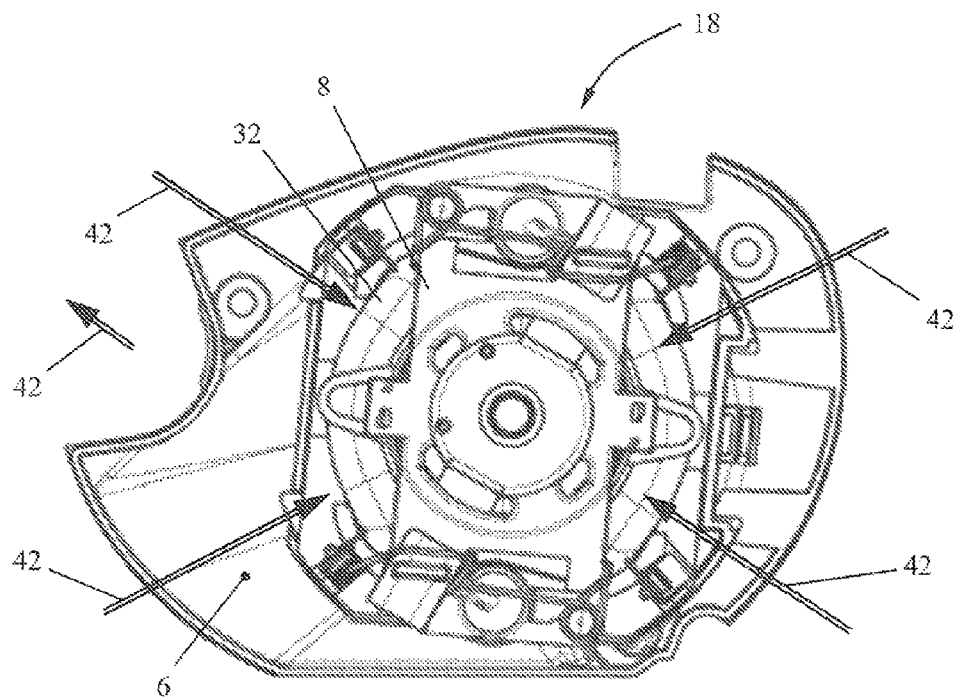
FIG. 7 is a plan view of the electric motor according to arrow VII of FIG. 3.

As illustrated in FIG. 6, the fan wheel 20 draws in cooling air in such a way that it enters the stator 4 of the electric motor 3 in the region of the commutator 15 between the arms of the end plate 8 in the direction of arrow 22, flows through the stator 4 in arrow direction 21, and passes through an intake opening 23 to the fan wheel 20, and from here is conveyed out through the codling-air spiral 19. The cooling-air stream which is generated by the fan wheel 20 therefore enters the stator 4 in the direction of arrow 22 in the region of the commutator 15, flows through the stator 4, and is expelled by means of the fan wheel 20. The cooling air is therefore axially drawn through the stator 4 of the electric motor 3.

Figure 10:
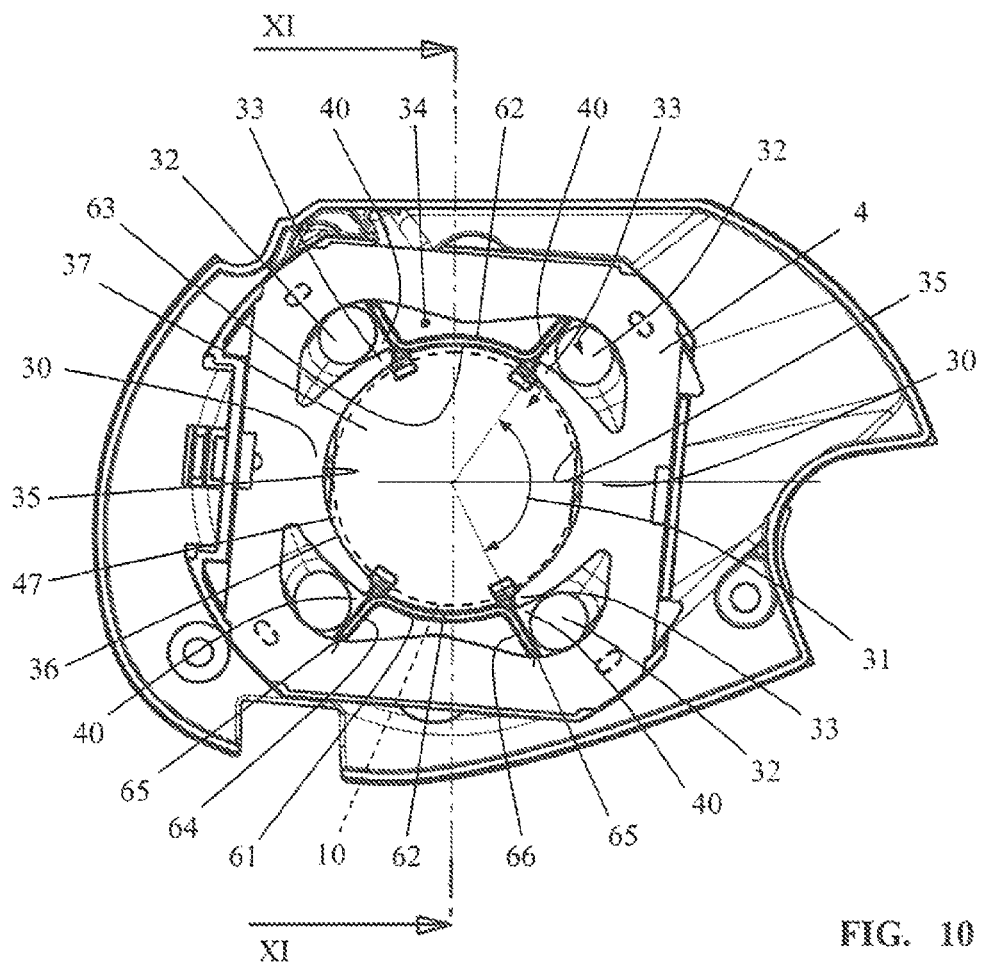
FIG. 10 shows a plan view of the sectioned motor according to arrow X of FIG. 8.

As shown in FIGS. 4, 5, 8 and 10, the stator 4 is made of stator laminations which are stacked one on the other. The stator 4 has two stator poles. 30, which are situated diametrically opposite one another, and extend over a circumferential angle 31 of approximately 110° (FIG. 10). The stator poles 30 are each fitted with a field winding 32 which is situated firmly on the stator poles 30. The stator poles 30 are designed in the form of part of a circle, wherein a free pole intermediate space 34 is formed between the ends 33 of the stator poles which face one another. The pole intermediate space extends over a circumferential angle of approximately 70°.

The fan housing 6 serves as a support 18 for guide bodies 61 (FIG. 8) which—as shown in section in FIG. 10—are in the form of approximately U-shaped guide walls 62. In the embodiment shown, the guide bodies 61 are integrally formed with the fan housing 6 and therefore form a common component with the fan housing.

Figure 8:
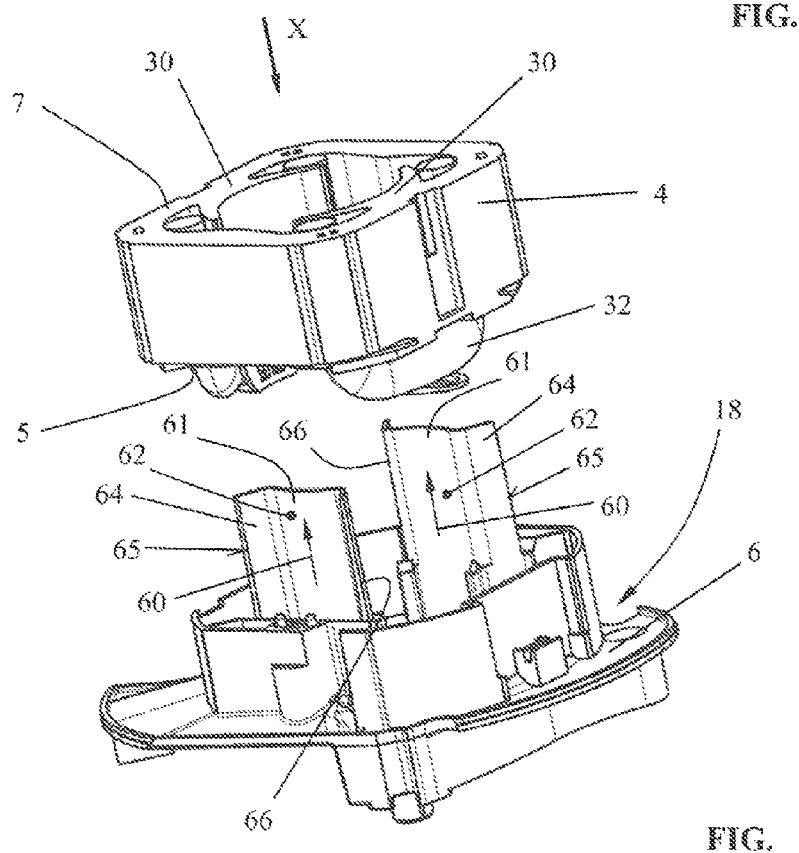
FIG. 8 is a part view of the electric motor having a fan housing part and a stator.

As shown in FIG. 8, the fan housing 6 is mounted on the end face 5 of the stator 4 in arrow direction 60, wherein the guide bodies 61 engage between the stator poles (FIG. 10) and project into the pole intermediate space 34. In this case, the arrangement is made such that the guide body 61 completely fills the pole intermediate space 34, wherein that side 63 which faces the rotor 10 is rounded in such a way that the guide bodies 61 and the pole faces 35 of the stator poles 30 form a common, closed circumferential wall 36. In this case, the guide body 61 extends, in the circumferential direction of the stator 4, from a field winding 32 of a stator pole 30 to the field winding 32 of the adjacent stator pole 30.

Figure 9:
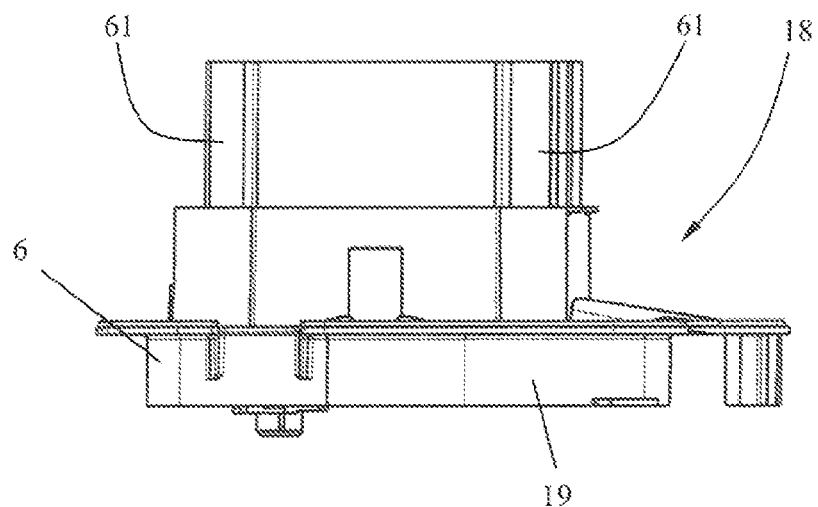
FIG. 9 is a side view of the fan housing part.

As shown in FIG. 9, the guide body is fixed to the support 18, that is, to the fan housing 6, by we of one end. The guide body 61 is made of a non-magnetic material. The fan housing 6 and the guide body 61 are preferably made of the same material, in particular of plastic.

The legs 64 and 66 of a U-shaped guide body 61 bear against the main body of the stator 4 by way of their end edge 65. Each leg (64, 66) extends from the end 33 of the stator pole as far as the main body of the stator 4 itself, so that a cooling duct 40 is delimited by the guide body 61 or, more specifically, the legs (64, 66) thereof and the field winding 32 of the stator 4. The cooling duct serves to conduct a component flow of the cooling-air flow 42 which passes axially through the stator 4.

Each guide body 61 which is inserted into the stator 4 axially from the end face 5 delimits one cooling duct 40 by way of its legs 64 and 66. The guide body 61—and therefore the cooling duct 40—extend over more than half the height of the stator 4, preferably over approximately the height H (FIG. 6) of a stator pole 30. Each guide body 61 delimits two cooling ducts 40. The height 14 of the stator pole 30 is in the range of from 20 mm to 50 mm; advantageous, overall heights are 21 mm, 31 mm and 41 mm.

Figure 11:
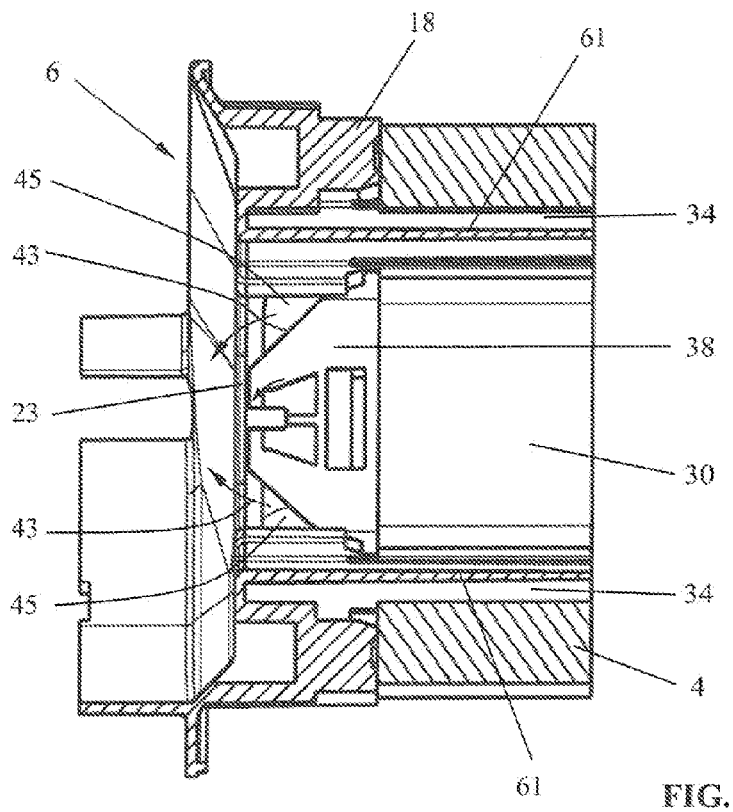
FIG. 11 is a section along line XI-XI of FIG. 10.
Figure 12:
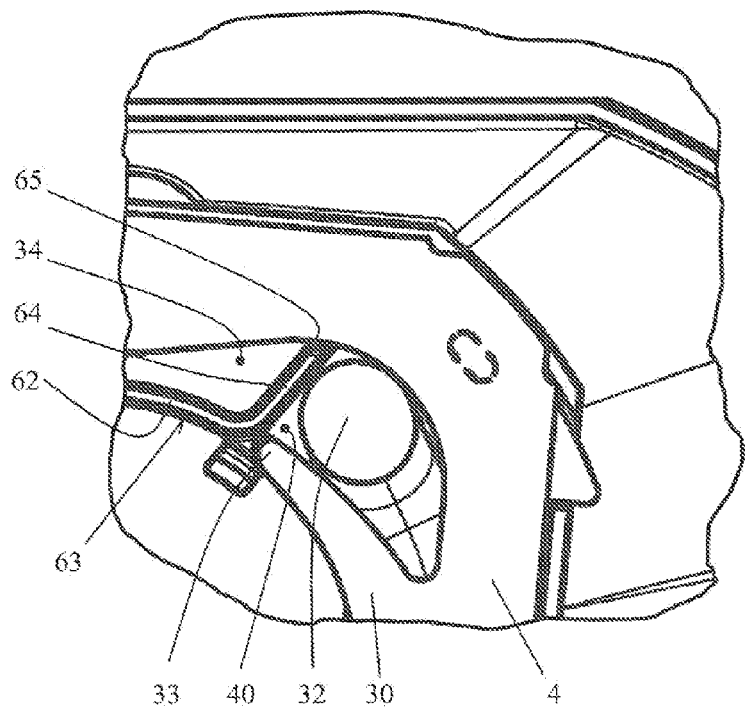
FIG. 12 is an enlarged part view of a cooling duct in section.

Each cooling duct 40 is axially open at its end 44 which faces the commutator 15; the cooling duct is axially closed at its end 46 which is situated axially opposite, but has a cooling-air outlet window 45 (FIG. 11) which is open in the radially inward direction, and by means of which component flows 43 of the cooling-air flow 42 enter the intake opening 23 in the fan housing 6.

A cooling-air outlet window 45 at the fan-side end 46 of the cooling duct 40 is firstly delimited by the fan housing 6, by the guide wall 62 of the guide body 61 and a non-conductive axial pole extension 38 which is situated axially between the stator pole 30 and the fan housing 6.

Figure 4:
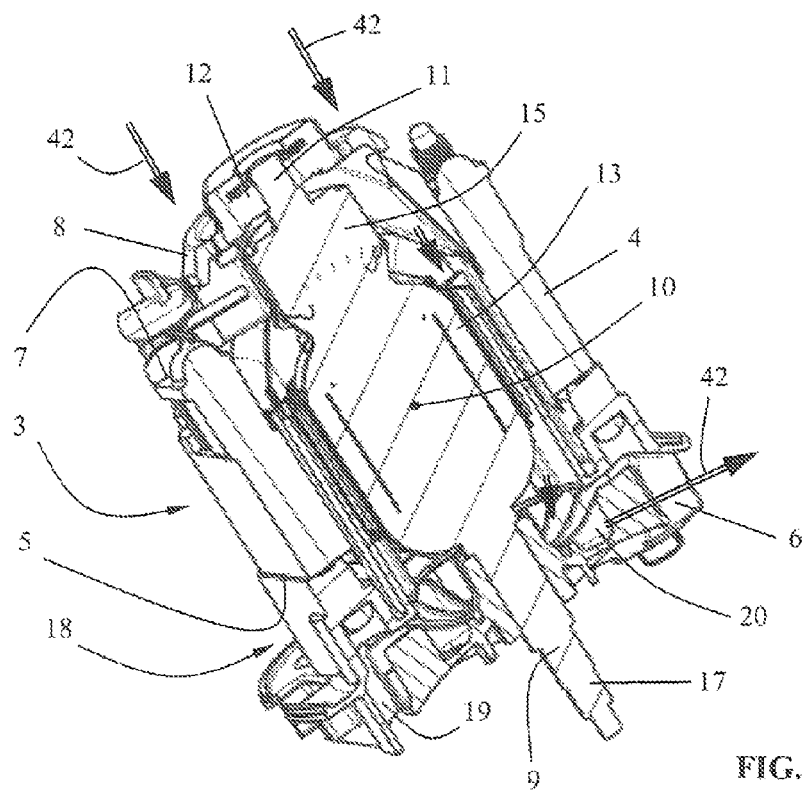
FIG. 4 is an axial section through the electric motor according to FIG. 3.
Figure 5:
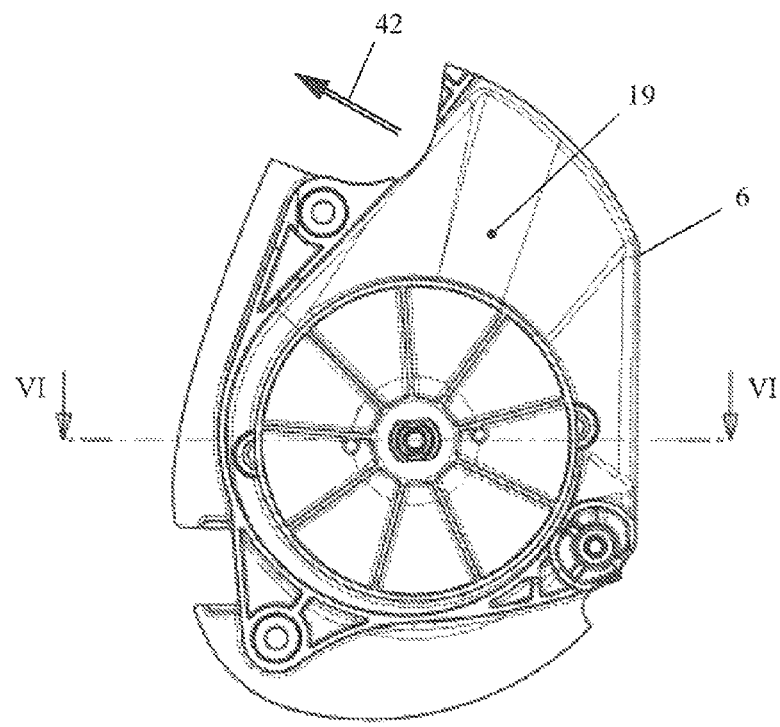
FIG. 5 is a plan view of the fan housing part of the electric motor according to FIG. 3.

During operation of the electric motor 3, the fan wheel 20, which is fixed on the rotor shaft 9, will rotate together with the rotor 10 and draw air from the stator interior 37 via the intake opening 23. This produces a cooling-air stream 42 which enters the electric motor at the end face 7 and is expelled by means of the cooling-air spiral 19 (FIG. 4).

As shown in FIG. 10, the gap 47 between the rotor 10 and the inner circumferential wall 36 is very narrow, and therefore has a high flow resistance. The cooling ducts 40, which are formed between the field windings 32 and the guide bodies 61 (four pieces of the cooling ducts being provided over the circumference of the stator 4 in the embodiment shown), have a relatively large flow cross section, so that the air preferably flows through the cooling ducts 40 to the intake opening 23 in the fan wheel 20. The cooling duct is formed between the guide body 61, which is preferably made of plastic, and the field winding 32 itself delimits the cooling duct 40. For this reason, the field winding 32 is in close contact with the cooling air which flows past if so as to exchange heat. This ensures a good cooling effect.

It is understood that the foregoing description is that of the preferred embodiments of the invention and that various changes and modifications may be made thereto without departing from the spirit and scope of the invention as defined in the appended claims.

What is claimed is:

1. An electric drive motor for a work apparatus, the electric drive motor comprising:

a stator having at least first and second stator poles;

first and second electric field windings carried on corresponding ones of said stator poles;

said first and second stator poles being arranged in a spaced relationship to each other in a circumferential direction and conjointly defining an intermediate pole space therebetween;

a rotor having a rotor shaft and being configured to rotate between said first and said second stator poles;

a fan wheel configured to be driven by said rotor shaft;

said fan wheel configured to generate a cooling air flow which enters said stator, flows through said stator and is blown out of said stator;

a non-magnetic guide body filling said intermediate pole space so as to cause said first and second field windings and said guide body to conjointly delimit a cooling channel for said cooling air flow;

a support; and, said guide body having a first end fixed on said support and a second end axially inserted into said stator.

2. The drive motor of claim 1, wherein said support is fixed on said stator at an end thereof.

3. The drive motor of claim 1 further comprising:
a fan housing; and,
said support of said guide body being fixed on said fan housing.

4. The drive motor of claim 3, wherein said fan housing is a cooling-air spiral.

5. The drive motor of claim 3, wherein said guide body is configured as a one-piece with said fan housing.

6. The drive motor of claim 1, wherein said guide body extends in the circumferential direction from said first field winding up to said second field winding.

7. The drive motor of claim 1, wherein said guide body has a first side facing said rotor; and, said first side has a rounded shape.

8. The drive motor of claim 7, wherein:
said first and said second stator pole each have respective first and second pole surfaces; and,
said guide body and said first and second pole surfaces conjointly form an inner closed circumferential wall.

9. The drive motor of claim 1, wherein said guide body delimits two cooling channels.

10. The drive motor of claim 1, wherein:
said stator has a height ($H_1$); and,
said guide body extends over more than half said height ($H_1$) of said stator.

11. The drive motor of claim 10, wherein:
said first stator pole has a height ($H_2$); and,
said guide body extends over said height ($H_2$).

12. The drive motor of claim 1, wherein said cooling channel has a cooling-air outlet window which radially faces to said rotor.

13. The drive motor of claim 12, further comprising:
a non-magnetic pole extension; and,
said cooling-air outlet window is delimited by said guide body and said non-magnetic pole extension.

14. The drive motor of claim 1 further comprising said guide body being configured as an approximately U-shaped guide wall.

15. The drive motor of claim 1 further comprising:
an electric commutator; and,
said rotor shaft is configured to carry said fan wheel and said electric commutator.

16. The drive motor of claim 1 further comprising:
an electric commutator; and wherein,
said air flow generated by said fan wheel is directed to enter said stator in the region of said commutator, flow through said stator via said cooling channel, and be drawn out via said fan wheel.

17. The drive motor of claim 1, wherein said first and said second stator poles are disposed diametrically opposite each other.

18. The drive motor of claim 1, wherein said cooling channel is delimited by said first field winding, said guide body and said first stator pole.

19. The drive motor of claim 18, wherein said cooling channel is further delimited by said stator.

* * * * *